United States Patent
Goto

(10) Patent No.: US 9,541,754 B2
(45) Date of Patent: Jan. 10, 2017

(54) POLYGON MIRROR SCANNER MOTOR

(71) Applicant: MINEBEA CO., LTD., Kitasaku-Gun, Nagano (JP)

(72) Inventor: Masaki Goto, Yonago (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 14/694,366

(22) Filed: Apr. 23, 2015

(65) Prior Publication Data

US 2015/0309308 A1 Oct. 29, 2015

(30) Foreign Application Priority Data

Apr. 25, 2014 (JP) .................. 2014-091692

(51) Int. Cl.
*G02B 26/08* (2006.01)
*G02B 26/12* (2006.01)

(52) U.S. Cl.
CPC ................... *G02B 26/121* (2013.01)

(58) Field of Classification Search
CPC ....... G02B 26/10; G02B 26/12; G02B 26/121; G02B 7/00; G02B 26/124; G02B 26/085
USPC ............... 359/198.1, 216.1; 310/90
See application file for complete search history.

(56) References Cited

U.S. PATENT DOCUMENTS

| | | | | |
|---|---|---|---|---|
| 6,215,217 | B1* | 4/2001 | Kurosawa | F16C 17/02 310/67 R |
| 7,843,619 | B1* | 11/2010 | Song | G02B 26/121 310/90 |
| 2011/0127867 | A1* | 6/2011 | Oh | F16C 17/08 310/90 |

FOREIGN PATENT DOCUMENTS

| | | |
|---|---|---|
| JP | 11-183831 A | 7/1999 |
| JP | 2000-347120 A | 12/2000 |

* cited by examiner

*Primary Examiner* — Euncha Cherry
(74) *Attorney, Agent, or Firm* — Carrier Blackman & Associates, P.C.; Joseph P. Carrier; Jeffrey T. Gedeon

(57) ABSTRACT

There is provided a polygon mirror scanner motor including: a rotor configured to rotate around a rotation axis; a fitting member configured to be fitted to an outer circumferential surface of the rotor; and a polygon mirror configured to be fitted to the outer circumferential surface of the rotor and bonded with the fitting member, wherein a diameter of the rotor at a part, to which the fitting member is fitted, is configured to be smaller than a diameter of the rotor at a part, to which the polygon mirror is fitted.

11 Claims, 8 Drawing Sheets

POLYGON MIRROR SCANNER MOTOR

BACKGROUND OF THE INVENTION

1. Field of the Invention

The present invention relates to a polygon mirror scanner motor, and in particular a polygon mirror scanner motor having a polygon mirror fitted to a rotor.

2. Description of the Related Art

A polygon mirror scanner motor is a motor which is mounted on a laser beam printer or the like so as to rotate a polygon mirror at a high speed. A laser diode emits a laser beam onto a polygon mirror rotationally driven by a polygon mirror scanner motor. A laser beam for scanning a surface of a photoreceptor is generated by reflecting the laser beam on the polygon mirror.

The polygon mirror typically has a fitting, hole formed in its center portion. The inner circumferential surface of the fitting hole is fitted to the outer circumferential surface of a rotor. Typically there is a clearance between the inner circumferential surface of the fitting hole and the outer circumferential surface of the rotor in order to make it easy to attach/remove the polygon mirror to/from the rotor. In a typical polygon mirror scanner motor, the polygon mirror is attached to the rotor by use of a holding spring, a screw, a bonding agent, etc.

For example, JP-A-11-183831 discloses a polygon mirror driving device including a rotary polygon mirror which includes a fitting hole, a rotor which includes a cylindrical portion fitted into the fitting hole of the rotary polygon mirror, and a mirror holding member which is screwed down to an upper portion of the cylindrical portion of the rotor. The mirror holding member includes a cap which is screwed down to the rotor, and a holding spring which is compressed between the cap and the rotary polygon mirror by a thrust-direction force applied from the cap. The rotary polygon mirror is attached to the rotor by a force applied from the holding spring and a bonding agent. The rotary polygon mirror and the mirror holding member are fitted to, the cylindrical portion of the rotor, parts having the same diameter, respectively.

JP-A-2000-347120 discloses a polygon mirror type light deflector including a rotor, a ring-like polygon mirror which has a center hole, a part of the rotor which it is inserted into and which is mounted on the rotor, and a cap which presses the polygon mirror to a mirror mounting portion and attaches the polygon mirror thereto. A mirror attaching portion of the cap is attached to the polygon mirror by a bonding agent. The polygon mirror and the cap are fitted to the portion of the rotor having same diameter.

Generally when a rotatable body is rotating, a centrifugal force proportional to the size of a radius from the center of the rotation axis of the rotating body acts on the rotating body so that the rotating body expands. As soon as the rotation stops, the centrifugal force disappears and the rotating body is restored to its original size. Thus, a rotating body that has a larger outer diameter, has a larger centrifugal force that acts on the rotating body so that the volume of expansion increases.

The polygon mirror scanner motor rotationally drives the polygon mirror at a high speed of about 40,000 rpm. The outer diameter of the polygon mirror is larger than the outer diameter of the rotor. Therefore, the centrifugal force acting on the polygon mirror is larger than the centrifugal force acting on the rotor. Thus, the clearance between the outer circumferential surface of the rotor and the inner circumferential surface of the fitting hole, which is small when the rotation stops, increases due to a difference between the centrifugal force acting on the polygon mirror and the centrifugal force acting on the rotor during the rotation. As a result, when the polygon mirror is rotated (started up) and stopped repeatedly, the posit on of the polygon mirror relative to the rotor gradually shifts, and this causes a submicron shift in the center of gravity of the polygon mirror, this problem causes deterioration of stability.

SUMMARY

The present invention has been made in view of the above circumstances, and one of the objects of the present invention is to solve the foregoing problem and to provide a polygon mirror scanner motor capable of improving stability.

According to an illustrative embodiment of the present invention, there is provided a polygon mirror scanner motor including: a rotor configured to rotate around a rotation axis; a fitting member configured to be fitted to an outer circumferential surface of the rotor; and a polygon mirror configured to be fitted to the outer circumferential surface of the rotor and bonded with the fitting member. A diameter of the rotor at a part, to which the fitting member is fitted, is configured to be smaller than a diameter of the rotor at a part, to which the polygon mirror is fitted.

According to another illustrative embodiment of the present invention, there is provided a method for assembling a polygon mirror scanner motor, the method including: mounting a rotor on a stator, fitting a polygon mirror through a fitting hole of the outer circumferential surface of a rotor boss, mounting a polygon mirror on a rotor table.

According to still another illustrative embodiment of the present invention, there is provided a method for assembling a polygon mirror scanner motor, the method including: screwing a cap down to a rotor of a mirror holding member; compressing a spring between the cap and a polygon mirror by a thrust-direction force applied from the cap; attaching the polygon mirror to the rotor by a force from the compressed spring; and bonding the polygon mirror to the rotor by applying, a bonding agent.

DETAILED DESCRIPTION

An embodiment according to the present invention will be described below with reference to the drawings.

Figure 1:
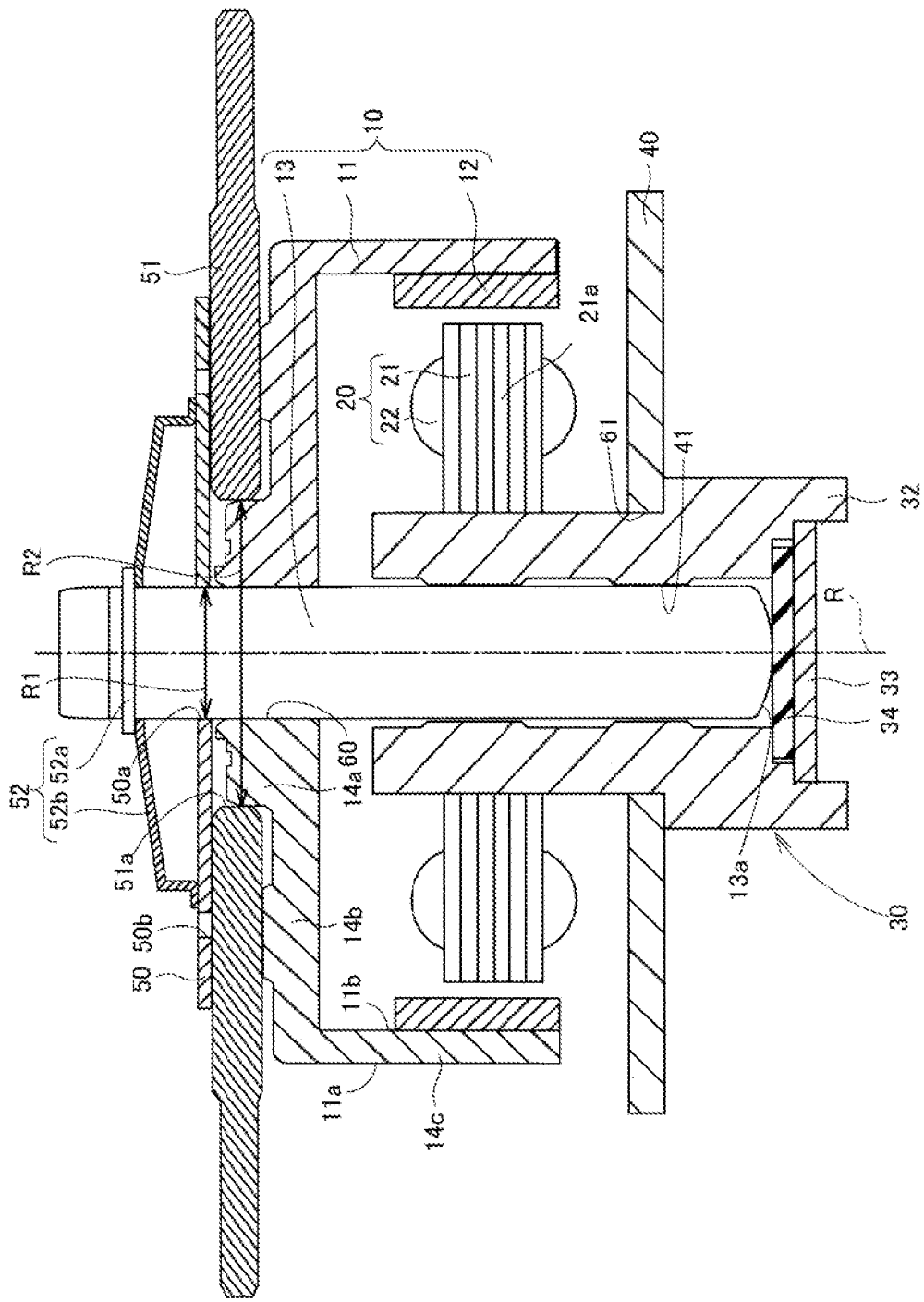
FIG. 1 is a sectional view schematically showing the configuration of a polygon mirror scanner motor according to an embodiment of the invention.

FIG. 1 is a sectional view schematically showing a configuration of a polygon mirror scanner motor according to an embodiment of the invention. In the following description of FIGS. 1 to 4B, the direction from a holding spring 52 to a thrust cover 33 along a rotation axis R (the downward direction in FIG. 1) will be sometimes referred to as "downward", and the direction from the thrust cover 33 to the holding spring 52 along the rotation axis R (the upward direction in FIG. 1) will be sometimes referred to as "upward".

The polygon mirror scanner motor according to the embodiment shown in FIG. 1 rotationally drives a polygon mirror. The polygon mirror scanner motor mainly has a rotor 10, a stator 20, a fluid bearing 30 and a base 40. The rotor 10 is supported by the fluid bearing 30. The rotor 10 rotates around the rotation axis R relative to the stator 20. The rotor 10 has a rotor frame 11, a magnet 12 and a shaft 13. The shaft 13 has a columnar shape and is provided in the position of the rotation axis R. In the rotor 10, the shaft 13 extends through the upward/downward direction of a center portion of the rotator frame 11. The rotor frame 11 can rotate with the shaft 13 and around the rotation axis R. The magnet 12 is attached to the rotor frame 11 so as to face the stator 20.

The rotor frame 11 includes a rotor boss 14a, a rotor table 14b and a side wall portion 14c. The rotor boss 14a has a circular plane shape and is fitted to the outer circumferential surface of the shaft 13. The rotor boss 14a has a cylindrical shape and protrudes upward relative to the rotor table 14h. The rotor table 14h is provided on the outer diameter side from the rotor boss 14a, so as to extend in the outer diameter direction (laterally in FIG. 1) from the rotor boss 14a. The side wall portion 14c extends downward from an outer-diameter-side end portion of the rotor table 14b.

A hole 60 to which the shaft 13 should be inserted is provided in a center portion of the rotor boss 14a. The rotor frame 11 is fitted to the outer circumferential surface of the shaft 13 through the hole 60. Thus, the rotor frame 11 is attached to the shaft 13. The rotor table 14b has, for example, a circular plane shape. The side wall portion 14c has a cylindrical shape and includes an outer circumferential surface 11a which is a surface facing the outer circumference side, and an inner circumferential surface 11b which is a surface facing the inner circumference side. The magnet 12 is attached to the inner circumferential surface 11b.

The polygon mirror scanner motor further includes a plate (which is an example of a fitting member) 50, a polygon mirror 51 and a holding spring 52 (which is an example of a biasing member). The plate 50 and the polygon mirror 51 are preferably made of the same material in order to make their thermal expansion coefficients equal to each other. For example, the plate 50 and the polygon mirror 51 are made of a metal such as aluminum.

The plate 50 has, for example, a sheet-like shape and includes a fitting hole 50a and a plurality of through holes 50b. The fitting hole 50a is provided in a center portion of the plate 50. The inner circumferential surface of the fitting hole 50a is fitted to the outer circumferential surface of the shaft 13 so that the plate 50 can be attached to the rotor 10. Each of the through holes 50b is provided around the fitting hole 50a so as to penetrate through the plate 50.

The polygon mirror 51 is provided under the plate 50. The polygon mirror 51 has a sheet-like shape with a polygonal plane shape. The polygon mirror 51 includes a fitting hole 51a provided in its center portion. The inner circumferential surface of the fitting hole 51a is fitted to the outer circumferential surface of the rotor boss 14a. The inner diameter of the fitting hole 51a is slightly larger than the outer diameter of the rotor boss 14a. Thus, a clearance is provided between the fitting hole 51a and the rotor boss 14a. As a result, the polygon mirror 51 can be attached or removed to and from the rotor 10 easily. The polygon mirror 51 is mounted on the rotor table 14b so that the bottom surface of the polygon mirror 51 is in contact with the rotor table 14b. In addition, the top surface of the polygon mirror 51 and the bottom surface of the plate 50 are bonded with each other. Although any portion of the polygon mirror 51 and the plate 50 may be bonded together, it is preferable that the surfaces perpendicular to the rotation axis R are bonded with each other.

In this embodiment a diameter R1 is defined as the diameter of a part of the rotor 10 to which the plate 50 is fitted, and R2 is defined as the diameter of a part of the rotor 10 to which the polygon mirror 51 is fitted. In the embodiment, both the shaft 13 and the rotor boss 14a have cylindrical shapes. Therefore, the diameter R1 corresponds to the outer diameter of the shaft 13, and the diameter R2 corresponds to the outer diameter of the rotor boss 14a. Since the rotor boss 14a is provided on the outer diameter side from the shaft 13, the diameter R1 is smaller than the diameter R2. When the diameter of the part of the rotor 10 to which the plate 50 is fitted is made the smallest in the diameter of the rotor 10 as that of the shaft 13, the volume of expansion in the inner diameter of the plate 50 caused by centrifugal force during the rotation of the rotor 10 can be reduced.

The holding spring 52 is provided above the plate 50. The holding spring 52 includes a fitting hole 52a and a plurality of legs 52b. The fitting, hole 52a is provided at the center of the holding spring 52. The inner circumferential surface of the fitting hole 52a is fitted to the outer circumferential surface of the shaft 13 so that the holding spring 52 can be attached to the shaft 13. The legs 52b protrude at equal intervals in the outer diameter direction and in the downward direction from the fitting hole 52a. An outer-diameter-side end portion of each leg 52b contacts the top surface of the plate 50. Thus, the holding spring 52 biases the polygon mirror 51 downward through the plate 50 with respect to the rotor table 14b (rotor 10).

The stator 20 has a stator core 21 which includes a plurality of teeth portions 21a formed to extend radially from the center to the outer radius, and stator coils 22' which are wound around the teeth portions 21a. The stator 20 is disposed on the inner circumferential side from the magnet 12 so as to be opposed to the magnet 12 through a space. The stator coils 22 generate a magnetic field when a current is applied thereto. A driving force (which is a force rotating the rotor 10) is generated due to the interaction between the magnetic field of the stator coils 22 and the magnetic field of the magnet 12.

A hole 61 is formed in a center portion of the base 40. The shaft 13 and a sleeve 32 of the fluid bearing 30 are arranged through the hole 61. Though not shown, a chive/control integrated circuit for driving and controlling a brushless motor, chip type electronic components (resistors and capacitors), a power MOS array for turning ON/OFF the application of a voltage to each stator coil 22, etc. may be formed in the base 40.

A groove (dynamic pressure groove) for generating dynamic pressure may be formed in at least one of the outer circumferential surface of the shaft 13 and the inner circumferential surface of a bearing hole 41 of the sleeve 32 so that the fluid bearing 30 can serve as a fluid dynamic pressure bearing. The bearing hole 41 may go through the sleeve 32 as shown in FIG. 1, or one end of the bearing hole 41 in the direction of the rotation axis R may be blocked.

The fluid bearing 30 includes the shaft 13, the sleeve 32, the thrust cover 33 and a thrust plate 34. The sleeve 32 includes the bearing hole 41, and the shaft 13 is inserted into the bearing, hole 41. The space (between the sleeve 32 and the shaft 13) constituted by the outer circumferential surface of the shaft 13, the inner circumferential surface of the bearing hole 41 and the thrust plate 34 is filled with oil (not shown). The thrust cover 33 covers a lower end portion of the bearing hole 41, and the thrust plate 34 is disposed between the thrust cover 33 and a lower end surface 13a of the shaft 13.

Figure 2A:
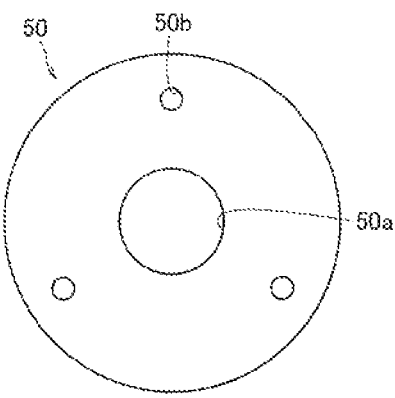
FIGS. 2A-2C are plan views schematically showing the configuration of a plate.
Figure 2B:
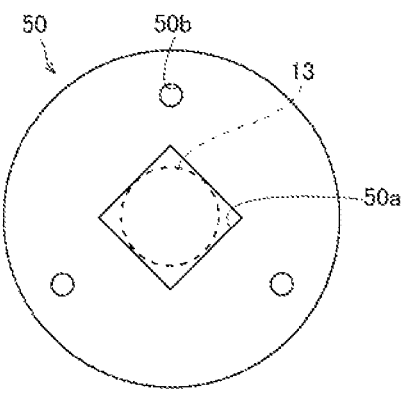
Figure 2C:
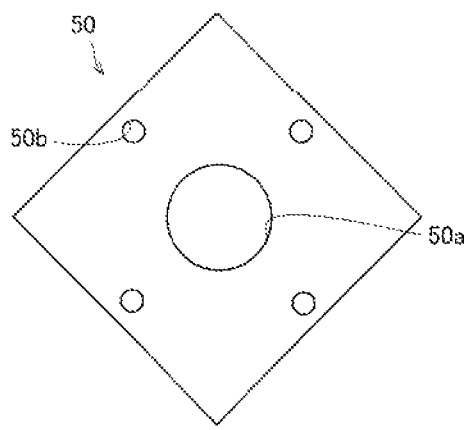

FIGS. 2A-2C are plan views schematically showing the configuration of the plate 50.

In the embodiment according to the present invention, the plate 50 may have a configuration shown in FIG. 2A, FIG. 2B, FIG. 2C or the like. In the plate 50 shown in FIG. 2A, the outer shape of the plate 50 has a circular plane shape, and the fitting hole 50a has a circular plane shape. In the plate 50 shown in FIG. 2B, the outer shape of the plate 50 has a circular plane shape, and the fitting hole 50a has a polygonal (rectangular here) plane shape. In this case, the precise dimension (size) of the fitting hole 50a can be based on the shaft 13 when the shaft 13, formed with the required precise dimension is inserted into the fitting hole 50a. Thus, a highly precise size of the fitting hole 50a can be obtained. In the plate 50 shown in FIG. 2C, the outer shape of the plate 50 has a polygonal (rectangular here) plane shape, and the fitting hole 50a has a circular plane shape. When the fitting hole 50a has a circular plane shape as shown in FIG. 2A and FIG. 2C, the inner diameter of the fitting hole 50a corresponds to the diameter R1. In the case where the fitting hole 50a has a polygonal plane shape as shown in FIG. 2B, the diameter of an imaginary circle, which passes the points where the fitting hole 50a contacts with the shaft 13, corresponds to the diameter R1.

Each of the plates 50 shown in FIG. 2A, FIG. 2B and FIG. 2C includes a plurality (three here) of through holes 50b formed at equal intervals, the positions and number of the through holes 50b are optional. No through holes 50b may be provided.

A method for assembling the polygon mirror scanner motor according to an embodiment of the present invention is provided.

FIGS. 3A-3B and FIGS. 4A-4B are partially sectional views for describing a method for assembling the polygon mirror scanner motor according to the embodiment. FIGS. 3A-3B and FIGS. 4A-4B provide enlarged views of the upper portion of the rotor frame 11 on the left side of the rotation axis R in FIG. 1.

Figure 3A:
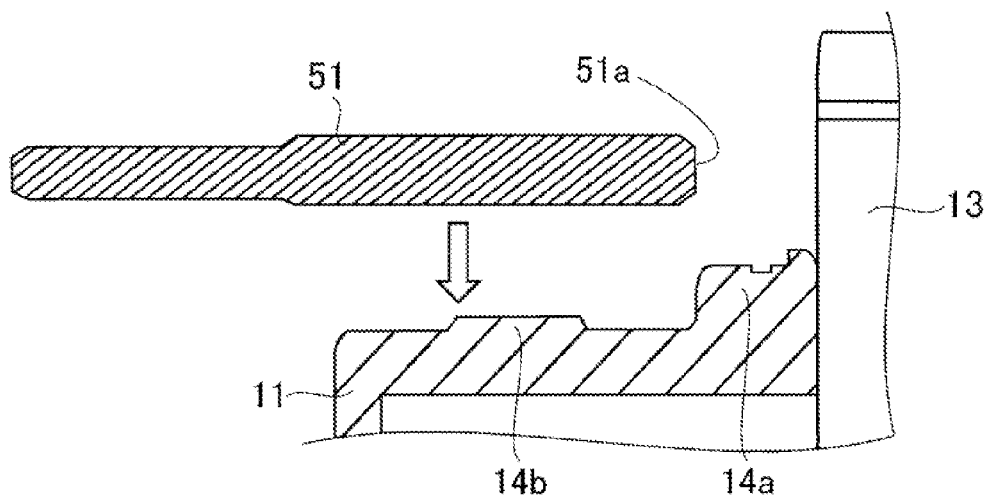
FIGS. 3A-3B are partially sectional views for explaining a first step of a method for assembling the polygon mirror scanner motor according to the embodiment of the invention.

As shown in FIG. 3A, after the rotor 10 is mounted on the stator 20, the fitting hole 51a of the polygon mirror 51 is fitted to the outer circumferential surface of the rotor boss 14a mounting the polygon mirror 51 on the rotor table 14b.

It is preferable that the polygon mirror 51 and the rotor boss 14a are fitted to each other by a method of clearance fit or the like. Thus, when a force is applied to the polygon mirror 51 that may damage the polygon mirror 51 or an event in which the polygon mirror 51 may be polluted by a hand, a tool or the like contacting the polygon mirror 51 can be avoided when the polygon mirror 51 and the rotor boss 14a are fitted to each other.

Figure 3B:
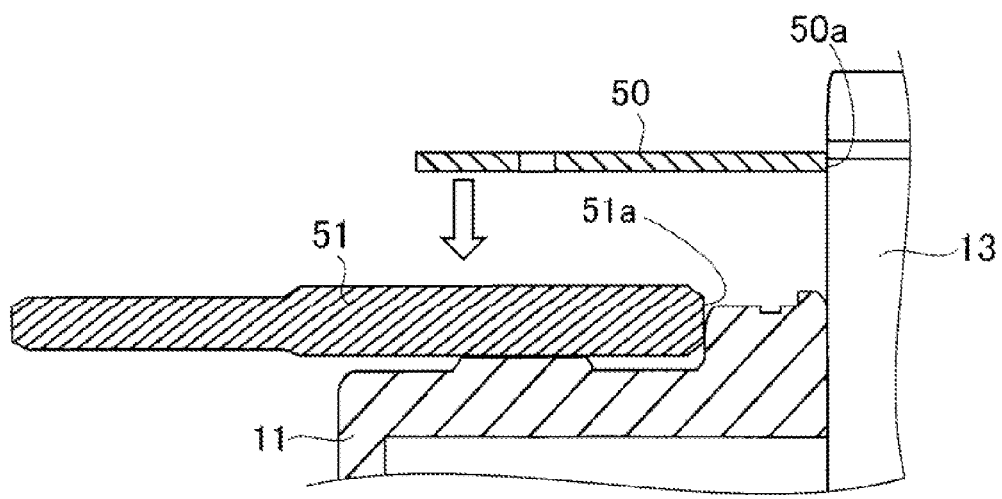

As shown in FIG. 3B the fitting hole 50a of the plate 50 is fitted to the outer circumferential surface of the shaft 13. Thus, the plate 50 is mounted on the polygon mirror 51. A method of transition fit, press fit or the like defined in JIS (Japanese Industrial Standards) B 0401 may be used as the method for fitting the plate 50 and the shaft 13 to each other. It is preferable that the fitting hole 50a has a precise dimension that corresponds to the outer circumferential surface of the shaft 13 in order to minimize the clearance appearing between the plate 50 and the shaft 13. When the clearance between the plate 50 and the shaft 13 is minimized, the plate 50 can return to its original position due to the interaction with the shaft 13 as soon as the rotor 10 stops even if the plate 50 is misaligned relative to the shaft 13 due to centrifugal force dining the rotation of the rotor 10. The clearance between the plate 50 and the Shaft 13 is preferably not larger than 1 μm.

Figure 4A:
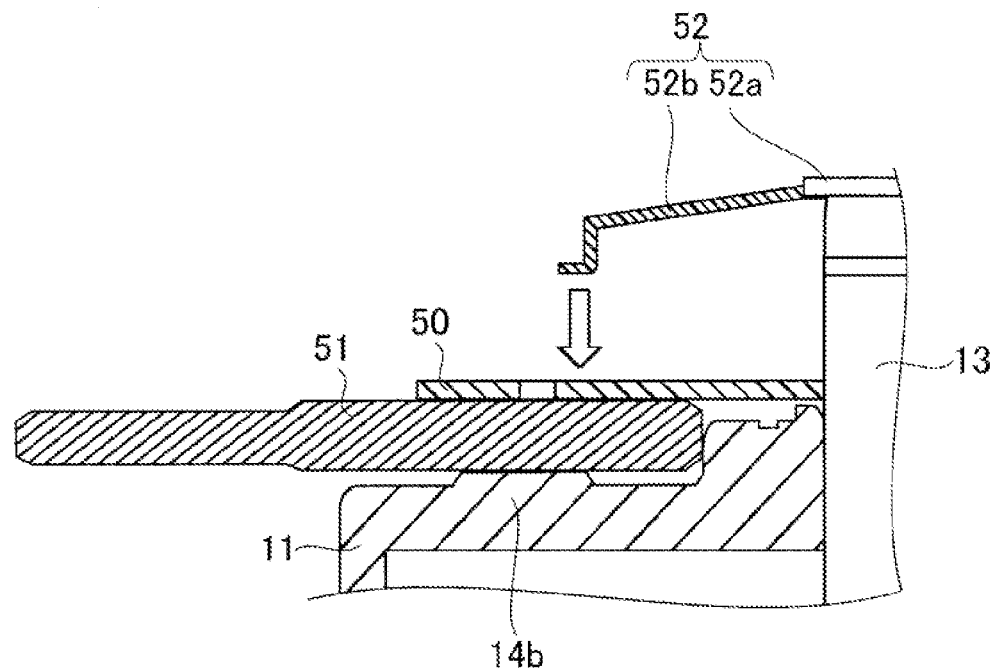
FIGS. 4A-4B are partially sectional views for explaining a second step of the method for assembling the polygon mirror scanner motor according to the embodiment of the invention.

As shown in FIG. 4A the fitting hole 52a of the holding spring 52 is fitted to the outer circumferential surface of the shaft 13, and the holding, spring 52 is moved downward. Thus, the legs 52b of the holding spring 52 are contracted so that the plate 50 and the polygon mirror 51 can be pressed and attached onto the rotor table 14b by the legs 52b.

Figure 4B:
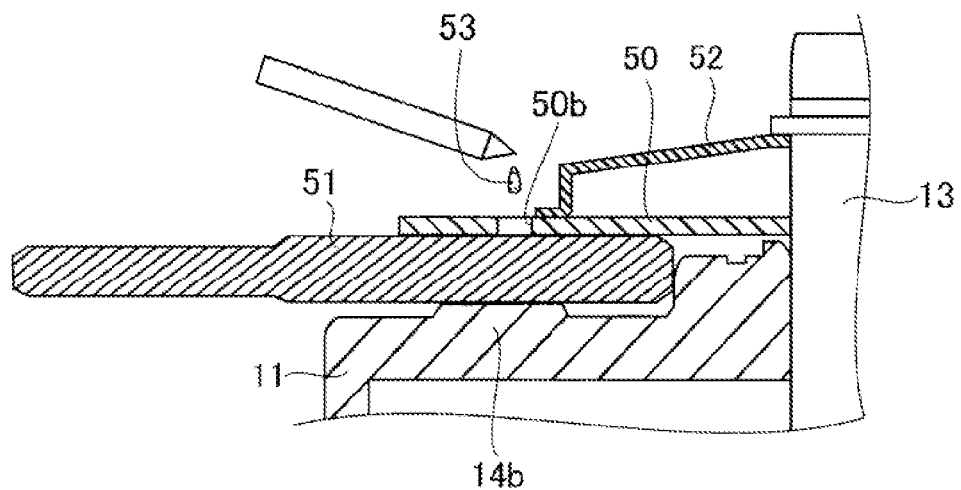

As shown in FIG. 4B a bonding agent 53 is injected between the plate 50 and the polygon mirror 51 through the through holes Sob so as to bond and attach the plate 50 and the polygon mirror 51 to each other. It is preferable that an anaerobic adhesive is used as the bonding agent 53. When the plate 50 and the polygon mirror 51 are made of metal, the permeability of the bonding agent can be enhanced so that the plate 50 and the polygon mirror 51 can be bonded easily.

When the plate 50 includes no through hole, a bonding agent may be applied to at least one of the top surface of the polygon mirror 51 and the bottom surface of the plate 50 after the polygon mirror 51 is mounted on the rotor table 14b (after the step shown in FIG. 3A) and before the plate 50 is mounted on the polygon mirror 51 (before the step shown in FIG. 3B).

In the polygon mirror seamier motor according to the embodiment, the polygon mirror 51 is bonded to the plate 50. Accordingly, even if the clearance between the outer circumferential surface of the rotor 10 and the inner circumferential surface of the fitting hole 51a of the polygon mirror 51 increases during rotation, misalignment of the polygon mirror 51 can be suppressed by the plate 50. That is, since the diameter R1 (the outer diameter of the shaft 13) of the part of the rotor 10 to which the plate 50 is fitted is smaller than the diameter R2 (the outer diameter of the rotor boss 14a) of the part of the rotor 10 to which the polygon mirror 51 is fitted, the volume of expansion in the fitting hole 50a of the plate 50 during the rotation is so small that misalignment of the plate 50 relative to the rotor 10 can be reduced. In addition, even if the plate 50 and the polygon mirror 51 are misaligned slightly relative to the rotor 10 due to expansion during the rotation, the plate 50 and the polygon mirror 51 can return to their original positions when the rotation stops. As a result, even when the polygon mirror 51 is rotated and stopped repeatedly, the polygon mirror 51 may be hardly misaligned relative to the rotor 10. Thus, the stability of the polygon mirror scanner motor can be improved.

In the present embodiment, since the plate 50, the polygon mirror 51 and the holding spring 52 are simply fitted to the shaft 13, when failure (such as pollution or deformation in the surface of the polygon mirror) occurs in the polygon mirror, the plate 50, the polygon mirror 51 and the holding spring 52 can be removed from the shaft 13. In this embodiment, the polygon mirror 51 can be removed (disassembled) easily.

The following simulations were carried out by the inventor in order to confirm the results of an embodiment of the present invention.

Figure 5:
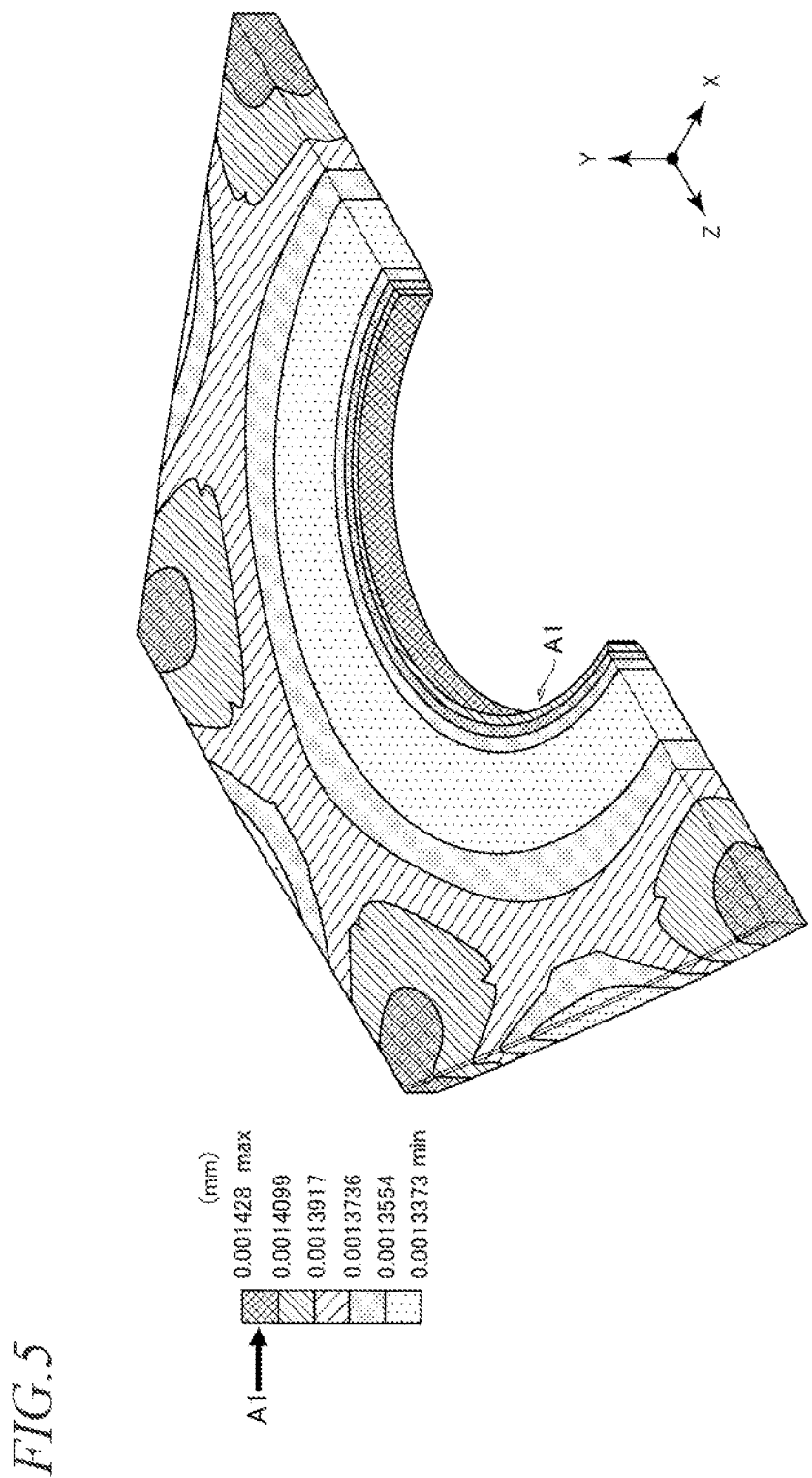
FIG. 5 is a view showing a simulation result of a distribution of the volume of expansion when a polygon mirror is rotating at 42,000 rpm.

FIG. 5 is a view showing a result of the volume of expansion distribution in a simulation where the polygon mirror is rotated at 42,000 rpm.

As shown in FIG. 5, expansion in the inner circumferential surface of the fitting hole of the polygon mirror (the inner diameter of the polygon mirror) is significant during the rotation of the polygon mirror. Specifically, the volume of expansion in the inner circumferential surface (a portion A1 in FIG. 5) of the fitting hole of the polygon mirror reaches about 1.4 μm.

Figure 6:
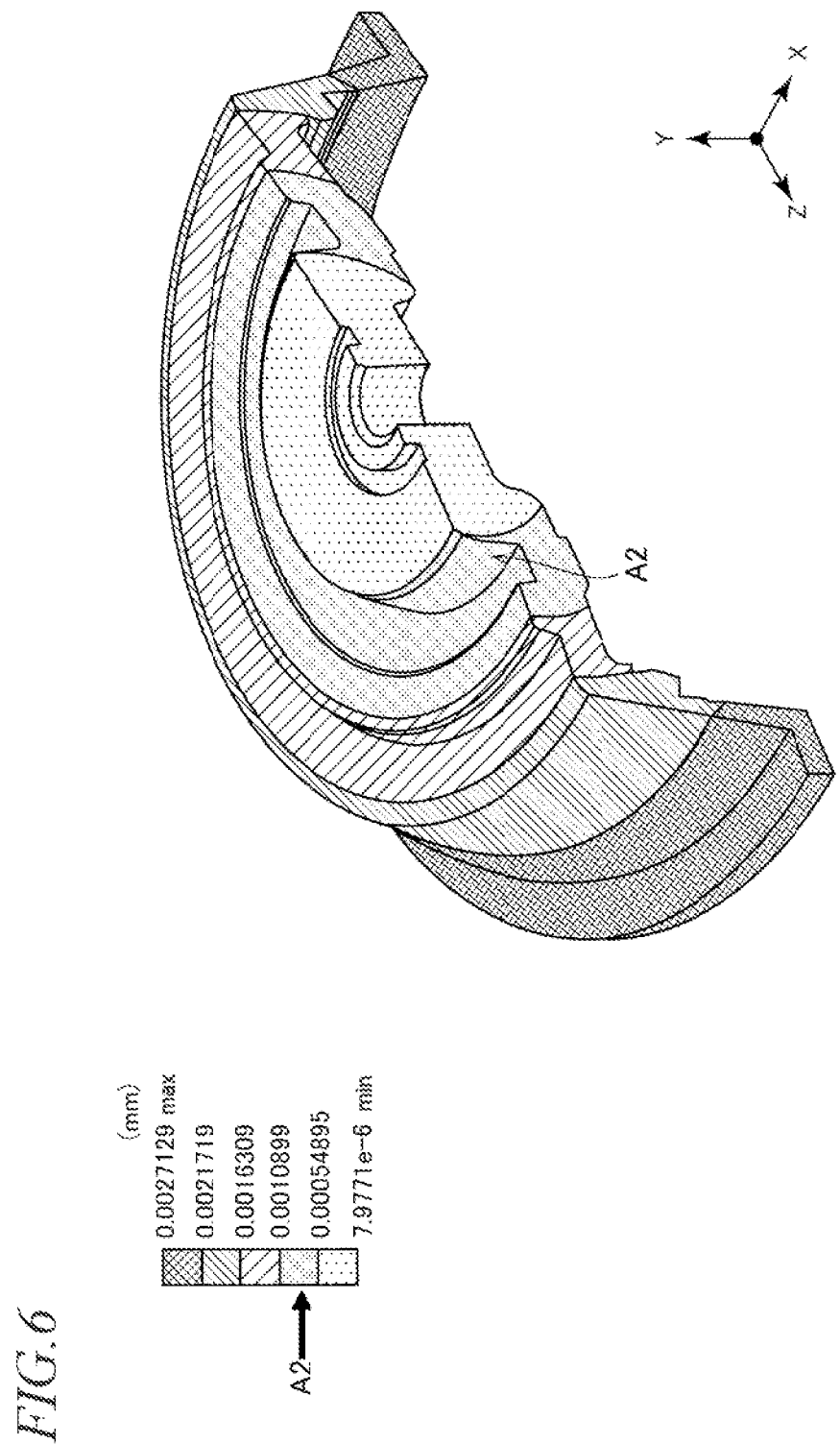
FIG. 6 is a view showing a simulation result of a distribution of the volume of expansion when a rotor frame is rotating at 42,000 rpm.

FIG. 6 is a view showing a result of the volume of expansion distribution in a simulation where the rotor frame is rotated at 42,000 rpm.

According to an embodiment in FIG. 6, the volume of expansion in an inlay portion (a portion fitted to the polygon mirror, which is a portion A2 in FIG. 6) of the rotor boss in the rotor frame is about 0.6 μm. Accordingly, a difference of 1.4 μm-0.6 μm=0.8 μm occurs between the inner circumferential surface of the fitting hole of the polygon mirror and the outer circumferential surface of the rotor boss during the rotation. As a result, when the polygon mirror is not bonded to the plate, there is a clearance of several μm between the rotor boss of the rotor frame and the fitting hole of the polygon mirror and the position of the polygon mirror relative to the rotor boss moves gradually when started and stopped repeatedly, generating an imbalance in the rotor.

Figure 7:
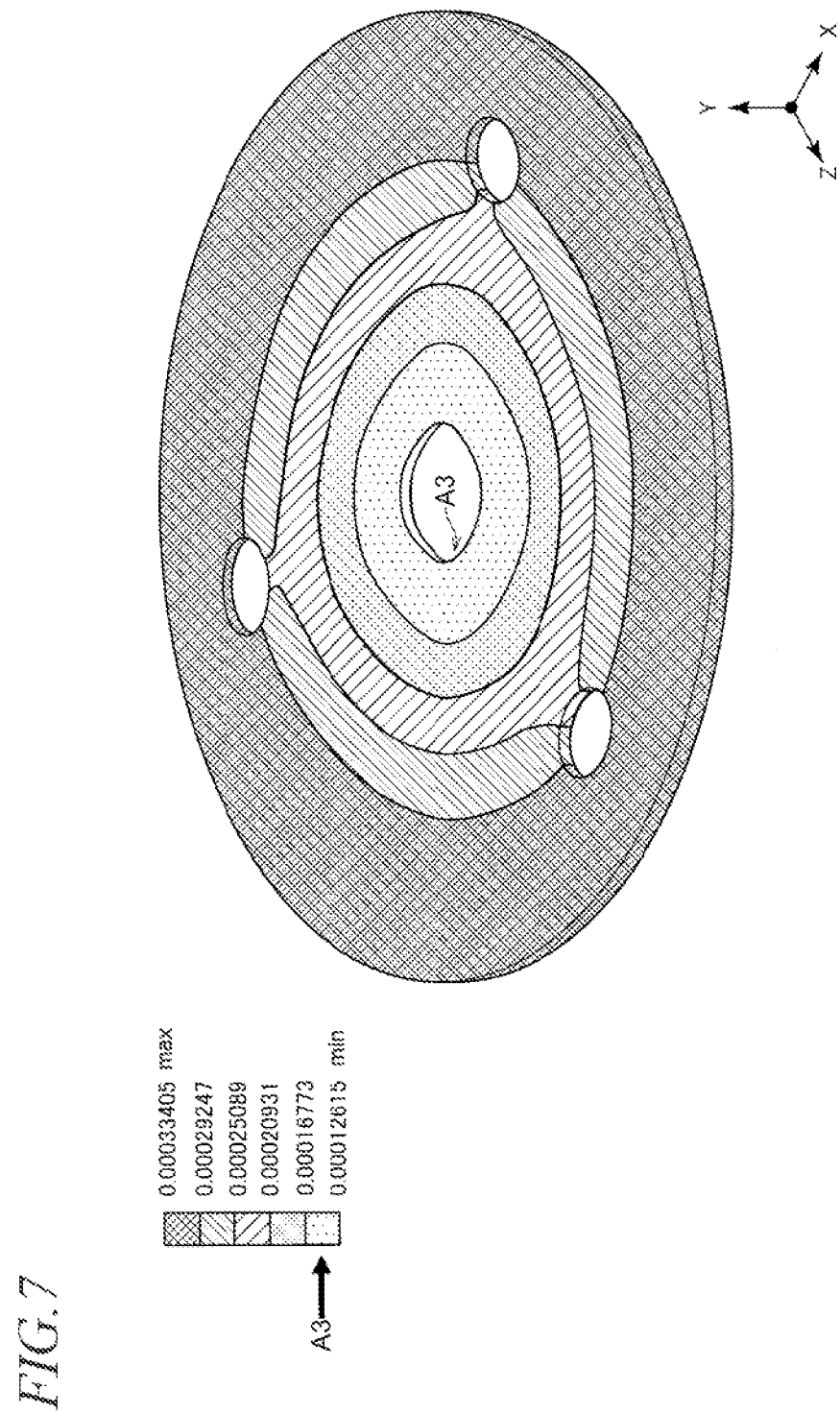
FIG. 7 is a view showing a simulation result of a distribution of the volume of expansion when the plate is rotating at 42,000 rpm.

FIG. 7 is a view showing a result of the volume of expansion distribution in a simulation where the plate is rotated at 42,000 rpm.

As shown in FIG. 7 assume that the diameter of the inner circumferential surface of the fitting hole of the plate (the inner diameter of the plate) is equal to the outer diameter of the shaft (assume that the clearance between the plate and the shaft is zero). In this case, the volume of expansion in the inner circumferential surface (a portion A3 in FIG. 7) of the plate is about 0.15 μm.

The volume of expansion in the plate shown in FIG. 7 is much smaller than the volume of expansion in the polygon mirror shown in FIG. 5 (in fact, the volume of expansion in the plate is estimated to be slightly larger than about 0.15 μm because the polygon mirror is bonded to the plate). Accordingly, it is understood that the polygon mirror is hardly misaligned relative to the rotor when the polygon mirror is attached to the plate having a smaller volume of expansion. Thus, it is possible to improve the stability of the polygon mirror scanner motor.

Figure 8:
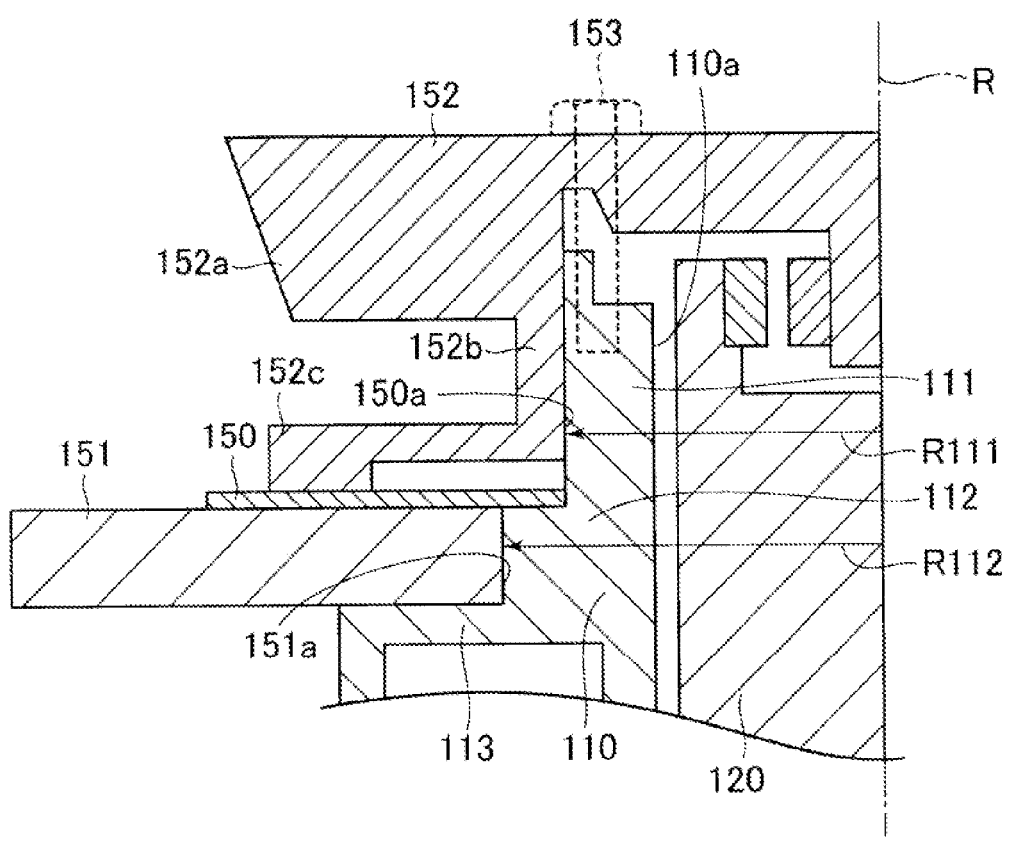
FIG. 8 is a sectional view schematically showing the configuration of a part of a polygon mirror scanner motor according to a modification of the invention.

FIG. 8 is a sectional view schematically showing the configuration of a part of a polygon mirror scanner motor according to a modification of the invention. FIG. 8 shows the configuration of only a part on the left side of the rotation axis R and above a mounting portion 113. In the description of FIG. 8, the direction from a cap 152a to a rotor 110 along a rotation axis R (the downward direction in FIG. 8) will sometimes be referred to as "downward", and the direction from the rotor 110 to the cap 152a along the rotation axis R (the upward direction in FIG. 8) will sometimes be referred to as "upward".

As shown in FIG. 8, the polygon mirror scanner motor according to the modification has a rotor 110, a stator 120, a plate 150, a polygon mirror 151 and a mirror holding member 152.

The rotor 110 rotates around the rotation axis R relative to the stator 120. The rotor 110 has a cylindrical shape, and the stator 120 is provided in a hollow portion 110a of the rotor 110. The rotor 110 includes a small diameter portion 111, a large diameter portion 112 and a mounting portion 113. The small diameter portion 111 has a diameter (outer diameter) R111. The large diameter portion 112 is provided under the small diameter portion 111 and has a diameter (outer diameter) R112 which is larger than the diameter R111 of the small diameter portion 111. The mounting portion 113 is provided under the large diameter portion 112 and protrudes in the outer diameter direction from the large diameter portion 112.

The plate 150 includes a fitting hole 150a provided in its center portion. The inner circumferential surface of the fitting hole 150a is fitted to the outer circumferential surface of the small diameter portion 111 of the rotor 110.

The polygon mirror 151 includes a fitting hole 151a provided in its center portion. The inner circumferential surface of the fitting hole 151a is fitted to the outer circumferential surface of the large diameter portion 112. The polygon mirror 151 is mounted on the mounting portion 113 so that the bottom surface of the polygon mirror 151 can contact the rotor 110. On the other hand, the top surface of the polygon mirror 151 and the bottom surface of the plate 150 are bonded with each other.

The mirror holding member 152 is provided in an upper end portion of the rotor 110. The mirror holding member 152 is attached to the rotor 110 by a screw 153. The mirror holding member 152 includes a cap 152a, a fitting portion 152b and a thin portion 152c. The cap 152a is attached to the upper end portion of the rotor 110 by the screw 153 so as to cover the rotor 110 and the stator 120. The fitting portion 152b extends downward from the bottom surface of the cap 152a. The fitting portion 152b has a cylindrical shape. The inner circumferential surface of the fitting, portion 152b is fitted to the outer circumferential surface of the small diameter portion 111. The thin portion 152c is provided under the fitting portion 152b. The thin portion 152c extends in the outer diameter direction from the fitting portion 152b. The plate 150 is bent like a plate spring so as to contact the top surface of the polygon mirror 151. Thus, the mirror holding member 152 presses and attaches the polygon mirror 151 onto the mounting portion 113. Further, the thin portion 152c and the top surface of the polygon mirror 151 are bonded to each other.

The diameter R111 (the outer diameter of the small diameter portion 111) of the part of the rotor 110 to which the plate 150 is fitted is smaller than the diameter R112 (the outer diameter of the large diameter portion 112) of the part of the rotor 110 to which the polygon mirror 151 is fitted.

Also in the polygon mirror scanner motor according to the modification, a similar effect to that in the aforementioned embodiment can be obtained. That is, the polygon mirror 151 is bonded to the plate 150 which is only slightly misaligned relative to the rotor 110 so that the misalignment of the polygon mirror 151 can be suppressed by the plate 150 even if the clearance between the outer circumferential surface of the rotor 110 and the inner circumferential surface of the fitting hole 151a of the polygon mirror 151 increases during rotation. As a result, even when the polygon mirror 151 is rotated and stopped repeatedly, the polygon mirror 151 is hardly misaligned relative to the rotor 110. Thus, it is possible to improve the stability of the polygon mirror scanner motor.

In every respect, the aforementioned embodiment should be regarded not as restrictive but simply as exemplary. The scope of the invention is shown not in the aforementioned description but in the claims. The invention is intended to include any change within the scope of the claims and the meaning and scope of their equivalents.

What is claimed is:

1. A polygon mirror scanner motor comprising:
    a rotor configured to rotate around a rotation axis;
    a fitting member configured to be fitted to an outer circumferential surface of the rotor; and
    a polygon mirror configured to be fitted to the outer circumferential surface of the rotor, the fitting member and the polygon mirror being bonded with each other by a bonding agent at respective surfaces perpendicular to the rotation axis,
    wherein a diameter of the rotor at a part, to which the fitting member is fitted, is configured to be smaller than a diameter of the rotor at a part, to which the polygon mirror is fitted, and
    wherein the respective surfaces perpendicular to the rotation axis overlap each other in the direction of the rotation axis.

2. The polygon mirror scanner motor according to claim 1,
    wherein the rotor includes a shaft having a columnar shape, the shaft being provided in a position of the rotation axis, and
    wherein the fitting member is fitted to an outer circumferential surface of the shaft.

3. The polygon mirror scanner motor according to claim 2,
    wherein the fitting member includes a fitting hole, into which the shaft is fitted, and
    the size of the fitting hole is determined based on the shaft.

4. The polygon mirror scanner motor according to claim 2,
    wherein the rotor further includes a rotor frame,
    wherein the rotor frame includes: a rotor boss configured to be fitted to the outer circumferential surface of the shaft; and a rotor table provided on an outer diameter side from the rotor boss, the rotor boss being protruded from the rotor table toward a first direction along the rotation axis, and
    wherein the polygon mirror is fitted to an outer circumferential surface of the rotor boss and configured to be in contact with the rotor table at a back face of the polygon mirror, the back face being faced toward a second direction along the rotation axis opposite to the first direction.

5. The polygon mirror scanner motor according to claim 1 further comprising:
    a biasing member configured to bias the polygon mirror toward the rotor,
    wherein the biasing member is configured to be in contact with the fitting member so as to bias the polygon mirror through the fitting member toward the rotor.

6. The polygon mirror scanner motor according to claim 1,
    wherein the fitting member and the polygon mirror are made of the same material.

7. The polygon mirror scanner motor according to claim 1,
    wherein the fitting member includes a through hole that penetrates the fitting member in a direction along the rotation axis.

8. The polygon mirror scanner motor according to claim 1,
    wherein the fitting member is fitted to the outer circumferential surface of the rotor by a transition fitting method or a press fitting method.

9. The polygon mirror scanner motor according to claim 1,
    wherein the fitting member includes a fitting hole, to which the outer circumferential surface of the rotor is fitted, the fitting hole having a polygonal plane shape.

10. A method for assembling a polygon mirror scanner motor, the method comprising:
    mounting a rotor on a stator,
    fitting a polygon mirror to an outer circumferential surface of a rotor through a fitting hole of the polygon mirror;
    fitting a fitting member to the outer circumferential surface of the rotor through a fitting hole of the fitting member; and
    injecting a bonding agent between the fitting member and the polygon mirror through a through hole provided in the fitting member to bond the fitting member and the polygon mirror to each other along respective surfaces perpendicular to a rotation axis.

11. The method according to claim 10, further comprising:
    before injecting the bonding agent,
        fitting a biasing member to the outer circumferential surface of the rotor through a fitting hole of the biasing member; and
        compressing the fitting member onto the polygon mirror by the biasing member.

* * * * *